(12) United States Patent
van Groenestijn

(10) Patent No.: US 9,477,001 B2
(45) Date of Patent: Oct. 25, 2016

(54) REDATUMING SEISMIC DATA WITH CORRECT INTERNAL MULTIPLES

(71) Applicant: Gert-Jan A. van Groenestijn, Houston, TX (US)

(72) Inventor: Gert-Jan A. van Groenestijn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 751 days.

(21) Appl. No.: 13/850,134

(22) Filed: Mar. 25, 2013

(65) Prior Publication Data

US 2013/0301387 A1 Nov. 14, 2013

Related U.S. Application Data

(60) Provisional application No. 61/646,031, filed on May 11, 2012.

(51) Int. Cl.
*G01V 1/36* (2006.01)

(52) U.S. Cl.
CPC ............... *G01V 1/368* (2013.01); *G01V 1/36* (2013.01); *G01V 2210/532* (2013.01); *G01V 2210/675* (2013.01)

(58) Field of Classification Search
CPC ...... G01V 1/36; G01V 1/28; G01V 2210/30; G01V 2210/53; G01V 2210/532; G01V 2210/675
USPC ............................................. 367/21, 24, 73
See application file for complete search history.

(56) References Cited

U.S. PATENT DOCUMENTS

| 6,125,330 A | 9/2000 | Robertson et al. |
| 6,687,659 B1 | 2/2004 | Shen |
| 6,691,039 B1 | 2/2004 | Wood |
| 6,721,662 B2 | 4/2004 | Wood |
| 6,735,528 B2 | 5/2004 | Wood et al. |

(Continued)

FOREIGN PATENT DOCUMENTS

| WO | WO 2010/014118 | 2/2010 |
| WO | 2012/137117 | 10/2012 |
| WO | 2012/160430 | 11/2012 |

OTHER PUBLICATIONS

Vasconcelos et al., "Representation theorems and Greens function retrieval for scattering in acoustic media", Physical Review E 80, 036605 (2009).*

(Continued)

*Primary Examiner* — Ian J Lobo
(74) *Attorney, Agent, or Firm* — ExxonMobil Upstream Research Company—Law Department

(57) ABSTRACT

Method for redatuming seismic data to any arbitrary location in the subsurface in a way that is consistent with the internal scattering in the subsurface. Direct arrival times are estimated from every point to every point on the edges of a virtual box in the subsurface (102). Green's functions are estimated by iterative optimization (103), using the direct arrival times as initial guesses (102), to minimize error in the source field reconstruction, which consists of the multidimensional auto-correlation of the Green's functions. The estimated Green's functions are the used to determine simulated internal multiple reflections (104). The measured data may be corrected by subtracting the simulated internal multiple reflections, or the Green's function may be used to do local imaging or local velocity model building, particularly advantageous in full wavefield inversion (104).

10 Claims, 6 Drawing Sheets

(56) References Cited

U.S. PATENT DOCUMENTS

| | | |
|---|---|---|
| 6,987,706 B2 | 1/2006 | Wood |
| 7,366,054 B1 | 4/2008 | Wood |
| 7,379,386 B2 | 5/2008 | Muyzert et al. |
| 7,382,682 B2 | 6/2008 | Zerouk |
| 7,382,684 B2 | 6/2008 | Love et al. |
| 7,408,836 B2 | 8/2008 | Muyzert et al. |
| 7,466,625 B2 | 12/2008 | Robertsson et al. |
| 7,523,003 B2 | 4/2009 | Robertsson et al. |
| 7,564,740 B2 | 7/2009 | Wood |
| 7,584,057 B2 | 9/2009 | Ozbek et al. |
| 7,599,251 B2 | 10/2009 | Love et al. |
| 7,948,826 B2 | 5/2011 | Wood |
| 7,987,054 B2 | 7/2011 | Anatoly |
| 2005/0135188 A1 | 6/2005 | Wood |
| 2007/0233437 A1* | 10/2007 | Manen et al. .................... 703/2 |
| 2008/0015783 A1 | 1/2008 | Robertsson et al. |
| 2008/0033655 A1 | 2/2008 | Ozbek et al. |
| 2008/0162051 A1 | 7/2008 | Ikelle |
| 2008/0205196 A1 | 8/2008 | Love et al. |
| 2009/0005999 A1 | 1/2009 | Wood et al. |
| 2009/0043545 A1* | 2/2009 | van Manen et al. ............ 703/2 |
| 2010/0067328 A1 | 3/2010 | Curtis |
| 2010/0074051 A1 | 3/2010 | Halliday et al. |
| 2010/0135114 A1 | 6/2010 | Teague et al. |
| 2010/0256916 A1 | 10/2010 | Liu et al. |
| 2011/0069581 A1 | 3/2011 | Krohn |
| 2011/0199858 A1 | 8/2011 | Otnes et al. |
| 2012/0041682 A1 | 2/2012 | Ramirez-Perez et al. |
| 2012/0073825 A1 | 3/2012 | Routh et al. |
| 2012/0259601 A1* | 10/2012 | Fuck et al. ....................... 703/2 |
| 2014/0039799 A1* | 2/2014 | Krohn ............................ 702/14 |

OTHER PUBLICATIONS

Berkhout, A. J. (1982), "Seismic migration, imaging of acoustic energy by wave field extrapolation, a: theoretical aspects," Elsevier, Chapter 5, pp. 137-144.

Fink, M. (2006), "Time-reversal acoustics in complex environments," *Geophysics* 71, pp. SI151-SI164.

Jakubowicz, H. (1998), "Wave equation prediction and removal of interbed multiples," 68th Annual International Meeting, Soc. Expl. Geophys., *Expanded Abstracts*, pp. 1527-1530.

Thorbecke, J. (1997), "Common Focus Point Technology, PhD thesis, Delft University of Technology," Chapter 4, pp. 41-.

van Groenestijn, G. J. A. et al. (2009), "Estimating primaries by sparse inversion and application to near-offset data reconstruction," *Geophysics* 74(3), pp. A23-A28.

Verschuur, D. J. et al. (1992), "Adaptive surface-related multiple elimination," *Geophysics* 57(9), pp. 1166-1177.

Verschuur, D. J. (1996), "Removal of interbed multiples," 58th Annual International Meeting, Eur. Ass. of Geosc. and Eng., *Expanded Abstracts*, 2 pgs.

Wapenaar, K. (2011), "A proposal for model—independent 3D wave field reconstruction from reflection data," *SEG Expanded Abstracts* 30, pp. 3788-3792.

Zheng, Y. (2010), "Retrieving the exact Green's function by wavefield crosscorrelation," *J. Acoust. Soc. Am.* 127(3), pp. EL93-EL-98.

* cited by examiner

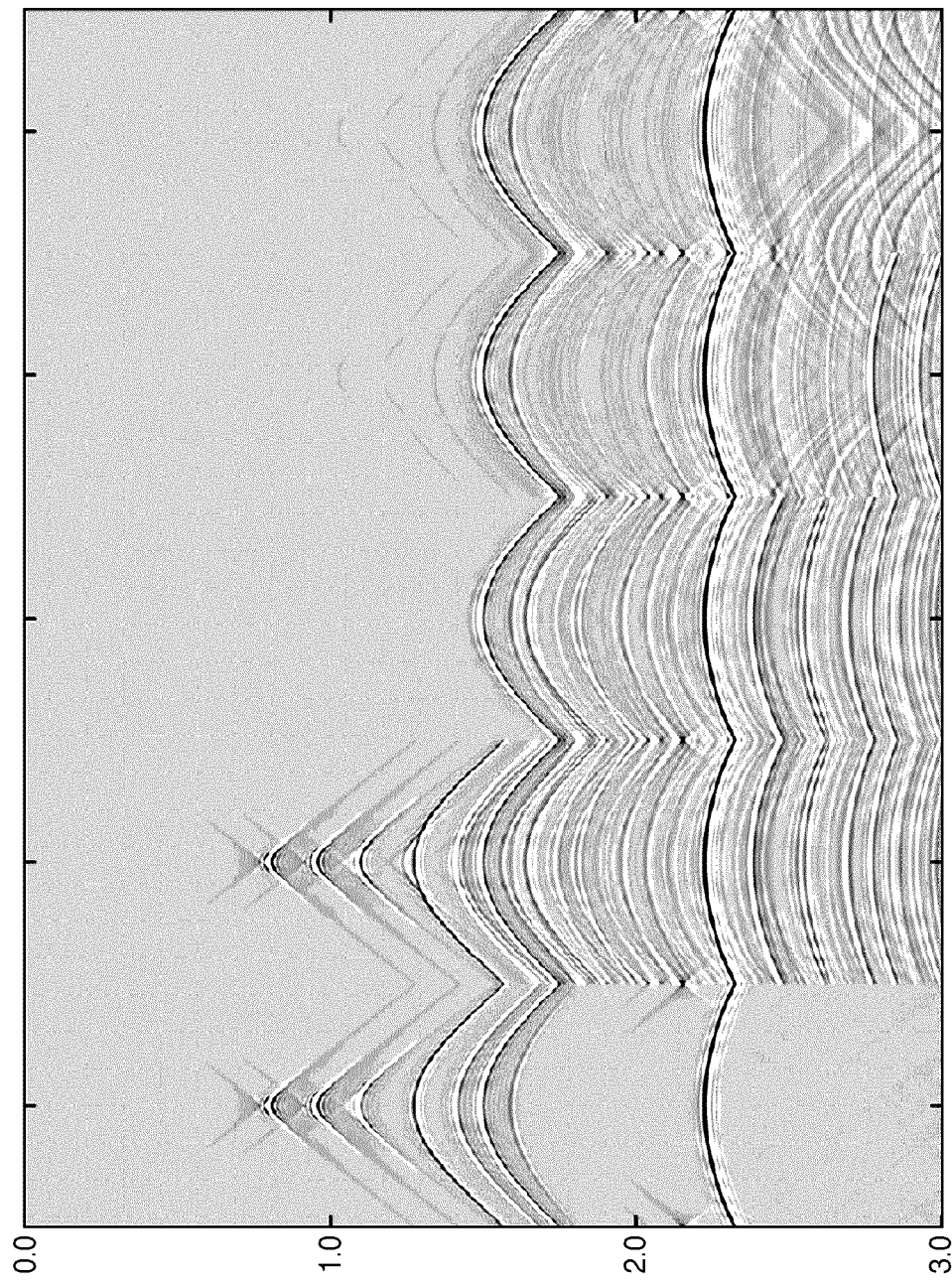

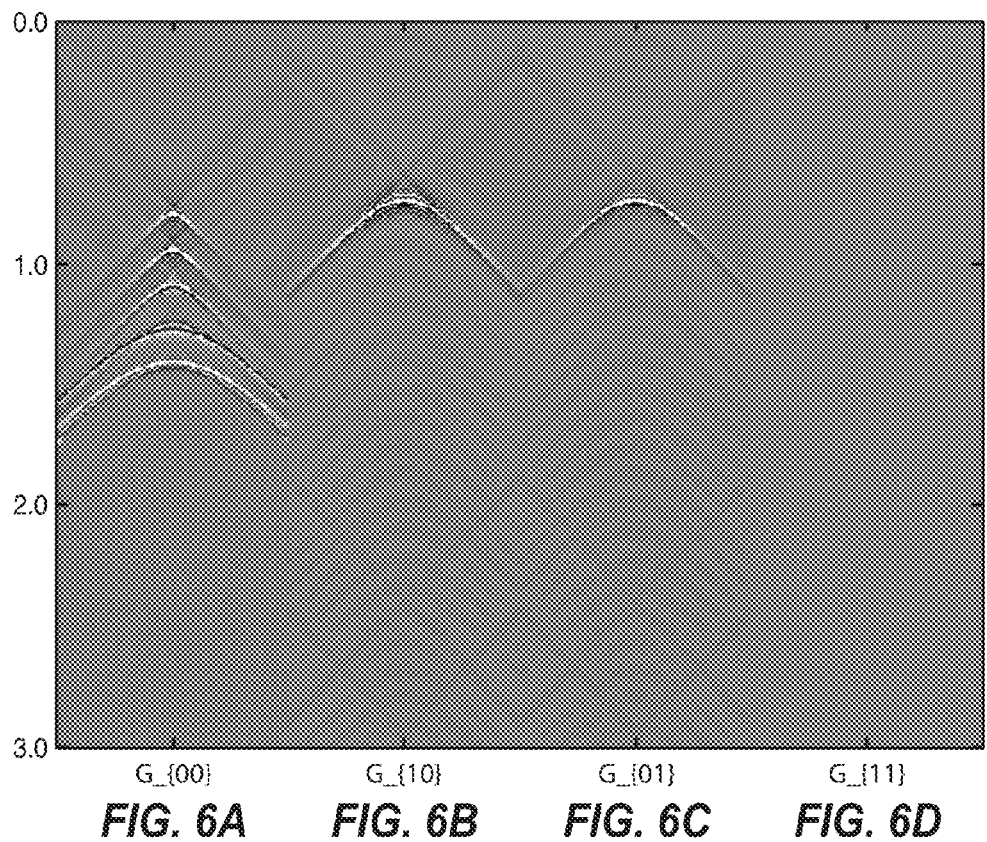
FIG. 6A  FIG. 6B  FIG. 6C  FIG. 6D
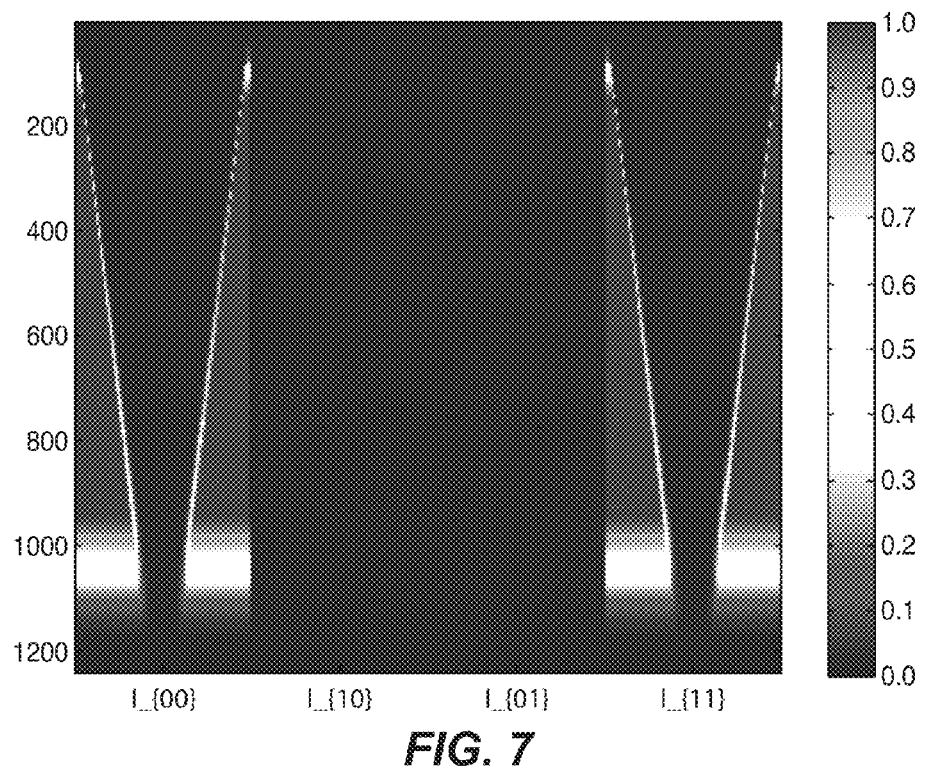
FIG. 7

REDATUMING SEISMIC DATA WITH CORRECT INTERNAL MULTIPLES

CROSS-REFERENCE TO RELATED APPLICATION

This application claims the benefit of U.S. Provisional Patent Application 61/646,031, filed May 11, 2012, entitled REDATUMING SEISMIC DATA WITH CORRECT INTERNAL MULTIPLES, the entirety of which is incorporated by reference herein.

FIELD OF THE INVENTION

The invention relates generally to the field of geophysical prospecting and, more particularly to processing of seismic data. Specifically, the invention is a method for redatuming the data to an arbitrary location in the subsurface in a way that is consistent with the internal scattering in the subsurface.

BACKGROUND OF THE INVENTION

An internal multiple is an event in recorded seismic data that has been reflected off at least two subsurface reflectors. Because most imaging algorithms have issues with multiple reflections, also called multiple scattering or internal scattering, internal multiples are traditionally considered noise that needs to be removed from the data (see e.g. Jakubowicz, 1998 or Verschuur and Berkhout, 1996). An internal multiple is to be distinguished from a surface-related multiple, which is a seismic event that includes at least one reflection from the air interface in addition to at least two reflections from subsurface reflectors. However, the multiple reflections do contain some information about the subsurface, and recently there has been a movement to capture that with a method called full-wavefield inversion ("FWI"), in which the entire wavefield of seismic data, including the multiple reflections and the direct transmissions from source to receiver, may be inverted to infer a physical properties model, such as a velocity model of the subsurface.

Redatuming of seismic data is a process in which, based on the measured data, one calculates the data that would have been measured if the sources and/or the receivers had been placed in a different location. An insightful example of redatuming is the correction applied to data measured in an environment where the surface is corrugated. Imaging algorithms usually do not deal very well with data that comes from sources and receivers at different altitude, and therefore, a new datum is chosen, usually below the elevation of any of the actual sources and receivers. The new datum will be populated with virtual sources and virtual receivers. The data that these virtual receivers would measure is calculated from the actual measured data. This could be done in a way that corrects the travel time of the seismic wave between the virtual source on the new datum and the actual source plus the travel time between the virtual receiver on the new datum and the actual receiver. By doing so, one tries to remove the influence of the subsurface above the new datum. Of course events that reflect once in the subsurface above the new datum will appear at non-causal times after the corrections, and one can therefore identify them as not coming from the subsurface below the new datum and discard them. However some internal multiples will reflect in the subsurface above the reflector many times, and they will not appear at non causal times after the correction. They may erroneously be seen as events coming from reflections from below the new datum. This error can lead to an incorrect interpretation of the subsurface and lead to drilling dry wells or missing a lucrative oil and gas reservoir. This is an example of a technical problem that the present invention can address.

In seismic surveying, illuminate is a term of art meaning how well an object in the subsurface can be detected by seismic waves. It might be physically impossible to send a seismic wave that is going to reflect at all parts of the object, simply because we are usually able to put sources only at the surface. For the same reason, it might be physically impossible to receive all reflected seismic waves from all parts of the object. The more parts of the object that can be detected, the higher the illumination of an object.

Previous attempts to remove internal multiples from seismic data include the following.

U.S. Pat. No. 7,987,054, "Efficient multiple prediction in two and three dimensions," to Baumstein; US Patent Application Publication No. 2012/0041682, "Attenuating internal multiples from seismic data," by Ramirez-Perez et al.; and US Patent Application Publication No. 2011/0199858, "Estimating internal multiples in seismic data," by Otnes et al., are all recursive internal multiple prediction methods. As such, their method must be applied several times, each time addressing a small group of reflectors in order to remove all the internal multiples at a desired depth. The present inventive method needs to be used only once to remove all internal multiples at a desired depth.

US Patent Application Publication No. 2010/0135114, "Wavefield extrapolation modeling for internal multiple prediction," by Teague et al. is a wavefield extrapolation method and, as such, is a model-driven and not a data-driven method. As such, it needs to model data based on a spatial model of the subsurface that includes at least the location of the strongest reflectors. The present inventive method does not need a spatial model of the subsurface.

SUMMARY OF THE INVENTION

The present inventive method, uses the information contained in the internal multiple data to remove them better than previous methods, or to better illuminate local parts of the subsurface. From surface seismic data and a few travel times, the method can remove from the seismic data all internal multiple reflections that are generated by a chosen part of the subsurface. It can use the information in the internal multiples to illuminate a chosen part of the subsurface from all sides, as if there were sources and receivers buried around that chosen part. Thus, the present inventive method has come to be referred to as "the box," with the term literally meaning the chosen part of the subsurface.

Because of the property of the box method to illuminate local parts of the subsurface, it is very advantageous for both seismic imaging and seismic velocity model building, including a velocity model inferred from inversion of the full seismic wavefield ("FWI"), where it can lead to a significant saving of (computational) costs and a better accuracy.

The present inventive method may be described as a redatuming method that is consistent with internal scattering in the subsurface. In one embodiment, the present invention is a computer-implemented method for removing internal multiple reflections from seismic data, or performing local inversion or local imaging of seismic data. With reference to the flowchart of FIG. 10, at step 101, surface measured data are deconvolved for their wavelet, and surface-related multiple reflections are removed. At step 102, a virtual (conceptual) subsurface box is defined having sources and receivers located on its edges or faces. Green's functions are estimated by estimating direct arrival times from source locations to receiver locations. At step 103, the Green's functions are updated by iterative optimization that minimizes error in source field reconstruction, or by another numerical solution technique. At step 104, the optimized Green's functions may be used to determine simulated internal multiple reflections within the box, which can be subtracted from the seismic data representing the box. Alternatively, the optimized Green's functions may be used to do local imaging of the seismic data within the box, or to build a local velocity model for the box, or for any other seismic data processing purpose requiring redatuming the seismic data to a different subsurface location or elevation.

BRIEF DESCRIPTION OF THE DRAWINGS

The present invention and its advantages will be better understood by referring to the following detailed description and the attached drawings in which:

FIG. 3A-3E show (3A) a shot gather, without any multiples, indicating eight reflectors; (3B) the same shot gather, but with internal multiples; (3C-3E) the shot gather of FIG. 3B after one, two and three steps of internal multiple removal using the present inventive method (all shot gathers have been fk-filtered);

FIG. 5C shows a new box created to obtain the local Green's functions;

FIGS. 6A-6D show the first estimates from the present inventive method of, respectively, $G(z_0,z_0)$, $G(z_1,z_0)$, $G(z_0,z_1)$, $G(z_1,z_1)$;

FIG. 7 shows $I(z_0,z_0)$, $I(z_1,z_0)$, $I(z_0,z_1)$, $I(z_1,z_1)$ in the fk-domain;

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons who work in the technical field will understand that all realistic applications of the present inventive method will be performed using a computer programmed to perform some or all steps of the method.

DETAILED DESCRIPTION OF EXAMPLE EMBODIMENTS

In order to illustrate the present invention, the theory will be described for 2D and 1.5D data, and a test example will be given applying the invention to synthetic 1.5D data. (1.5 dimensions means that the data are obtained from a 2 dimensional subsurface that changes only in the vertical direction, and is continuous in the horizontal direction). However, it should be clear to anyone skilled in the technical field that it can be easily applied to data with different geometries (e.g. 3D). The theory described is given for the acoustic case (assumes that shear waves can be neglected and only pressure waves exist), but it is obvious to someone skilled in the art to also do it for the elastic case (both shear waves and pressure waves are taken into account).

The Forward Model of Primaries and Internal Multiples for a Box

The theory presented here for the box method assumes that: 1) the surface-related multiples have been removed from the data, 2) that the wavelet is divided out from the data, meaning that the data is transformed into am impulse response, and 3) the receiver ghost (the upgoing wavefield detected by the receivers is detected again as the 'ghost' when it reflects downward at the surface) has been removed from the data. Assumptions 1 and 2 can be achieved using, for example, the EPSI method disclosed in van Groenestijn and Verschuur, 2009. Assumption 3 can be achieved by traditional receiver deghosting algorithms.

Figure 1C:
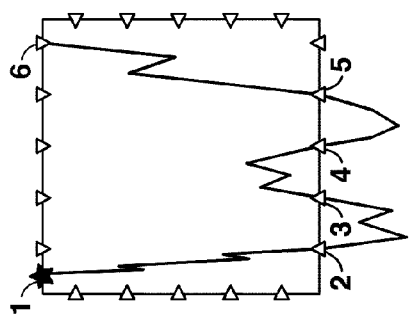
FIGS. 1A-1C show raypaths illustrating (1A) an outgoing wavefield, (1B) an incoming wavefield, and (1C) Green's functions.
Figure 1B:
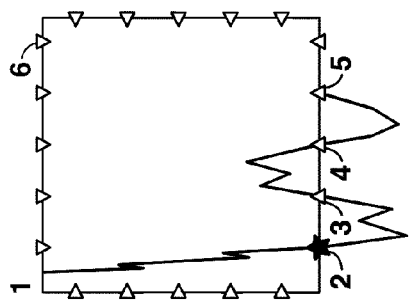
Figure 1A:
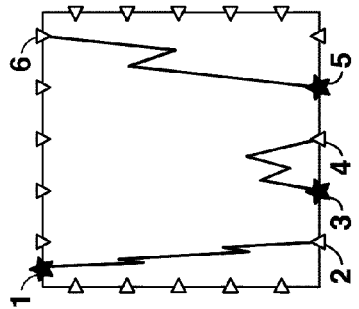

Consider the 2D geometry as drawn in FIGS. 1A-1C, with the two dimensions shown being horizontal and vertical (the top of each diagram represents the surface, i.e. z=0). There are sources, denoted by stars, and receivers, denoted by triangles, around an area of the subsurface, the box, which is indicated by the box shown in the drawings. In most actual surveys, it will be physically possible to put sources and receivers only at the surface, but the box method aims at reconstructing the other source and receiver positions.

By making use of the detail hiding operator notation (see Berkhout, 1982), the wavefield can be split into three building blocks. The detail hiding operator notation makes use of frequency matrices. These matrices are obtained by ordering the data in a cube e.g. $x_0(t,\xi_r, \xi_s)$ where $x_0$ is the outgoing impulse response wavefield that will be described below, t is the time, $\xi_r$ is the receiver position, $\xi_s$ the source position, and transforming this cube to the frequency domain. A frequency slice of this cube is the outgoing impulse response matrix, $X_0$. Note that in this matrix one column represents a monochromatic (i.e. only one frequency) shot gather and one row a monochromatic receiver gather. Also note that the detail hiding operator notation, (Berkhout, 1982), as used in the EPSI reference or in the disclosure of the SRME (surface related multiple elimination) method (Verschuur et al, 1992), always assumes that the sources and receivers are on the same depth, but the detail hiding operator notation in the present box method will allow for the receivers and sources to be on different depths.

The three building blocks referred to above are explained next.

The outgoing impulse response $X_0$ is the wavefield that starts in the box and moves out of the box. In FIG. 1A, an example raypath 11 of the outgoing impulse response starts at the source 1 going into the box and is measured at the receivers 2, 4 and 6 going out of the box. The signals that are measured at the receivers 3 and 5 are not part of $X_0$, because they are going into the box.

The incoming impulse response Y is the wavefield that starts outside the box and moves into the box. In FIG. 1B, an example raypath (part of the same raypath shown in FIG. 1A) of the incoming impulse response starts at the source 2 going out of the box and is measured at the receivers 3 and 5 coming into the box.

The Green's function G is the wavefield that starts in the box and ends at the edge of the box. The Green's function wavefields never leave the box. In FIG. 1C, three example Green's functions raypaths are shown. One Green's function starts at source 1 going into the box and ends at the edge of the box at receiver 2.

The three building blocks can now be combined into the forward model of the box:

$$X_0 = G + GYG. \tag{1}$$

The first G on the right hand side of equation 1 explains the part of the outgoing impulse response's wavefield that has never left the box. GYG explains how the wavefield first leaves the box (G), finally re-enters the box (YG), and is detected again when leaving the box (GYG).

In most cases only a small part of the forward model are actual measurements: the elements of matrix $X_0$ that represent the sources and receivers at the surface. Also matrix G has elements that represent sources and receivers at the surface, and the measured data might be used as a first estimate for these elements. To solve for the unknowns in the forward model, time reversal and travel times are used.

Because of the property of G that its wavefield ends at the box and never gets back in, and the medium inside the box is assumed to be lossless, time reversal (see Fink, 2006; or Wapenaar et al, 2011) can be applied without any approximation or side effects:

$$G^*G = I, \tag{2}$$

where each element in $G^*$ equals the complex conjugate of the corresponding element in matrix G. Note that $G^*$ is the time reversed version of G. I is the identity matrix, and can be thought of as the source that is reconstructed after the recorded wavefield G has been time reversed back into its origin.

Equations 1 and 2 are valid for every size box. The use of travel times will define the size of the box. It is assumed that the first arrival times of every wavefield between each source-receiver combination on the box can be obtained either from an initial velocity model or from common focal point (CFP) gathers (see e.g. Thorbecke 1997). These first arrival times can be used to come up with a rough estimate of the amplitude of the first arrival, and then they will be inserted into the first estimate of G.

Using the Box to Remove Internal Multiples for a Horizontally Layered Medium

Figure 2:
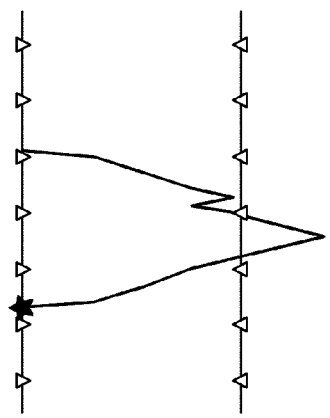
FIG. 2 shows the box of the present inventive method for a horizontally layered medium.

Because of the invariance of a horizontally-layered medium in the horizontal direction, the left and right side of the box are not necessary, and the method needs to consider only the top and bottom sides (see FIG. 2).

The matrices in the forward model now each have four sub-matrices, e.g.:

$$G = \begin{pmatrix} G(z_0, z_0) & G(z_0, z_1) \\ G(z_1, z_0) & G(z_1, z_1) \end{pmatrix}, \tag{3}$$

where $G(z_i, z_j)$ relate to the wavefields that have sources at the surface ($z_j = z_0$) or at the bottom of the box ($z_j = z_1$), and receivers at the surface ($z_i = z_0$) or at the bottom of the box ($z_i = z_1$).

To test this application of the present inventive method, a dataset without surface multiples was created from a synthetic subsurface model with 8 reflectors. A shot gather of this dataset can be seen in FIG. 3B. It can be seen in FIG. 3B, that the wavefield coming from the source has been recorded by the receivers after (multiple) reflections at the reflectors in the subsurface, as parabolic-like curves. These parabolic-like curves are a function of source-receiver spacing (called "offset") in the horizontal direction, and travel time of the seismic wave in the vertical direction. It is the task of seismic processing to turn these measurements into an image of the subsurface. FIG. 3A shows the same data, but without internal multiples; this clearly indicates the position of the 8 reflectors. In this demonstration, we are going to remove all the internal multiples related to the first five (the five shallowest) reflectors from the data. The data has been filtered in the fk-domain, as can be clearly seen by the trained eye. This filtering has not touched the events related to the last 3 reflectors which are in the area of interest.

The bottom of the box has been set between the $5^{th}$ and $6^{th}$ reflector (see FIG. 2). Through NMO-flattening, the two-way travel times are reconstructed. We now mask all events from the shot gather that arrived after the two-way travel time (see FIG. 6A), so that the shot gather no longer contains any information of events related to reflectors outside the box. This masked shot gather is the first estimate of $G(z_0,z_0)$. One-way travel times are obtained from the two-way travel times, and they are used together with the amplitudes information in the measured data to come to a first estimate for $G(z_0,z_1)$ and $G(z_1,z_0)$, which are shown in FIGS. 6C and 6B, respectively. The first estimate of $G(z_1,z_1)$ is set to all zeroes; see FIG. 6D.

As stated before, matrix I can be seen as the reconstructed source. Therefore only the fk values of the source that have not been filtered away in the data can be reconstructed. FIG. 7 shows I in the fk-domain.

To obtain the full G, the following objective function may be iteratively minimized:

$$J_i = \Sigma_\omega \Sigma_{j,k} |G^*_i G_i - I|^2, \tag{4}$$

where i denotes the iteration number, $\Sigma_{j,k}$ indicates a summation over all the squared elements of the matrix (i.e. a summation over all sources and receivers in the wavenumber domain), and $\Sigma_\omega$ indicates a summation over all the frequencies.

The update step, $\Delta G$, is a steepest decent step in this example, obtained by taking the derivative of J with respect to the elements of G:

$$\Delta G = -G^T(G^*G - I) - (G^*G - I)G^T, \tag{5}$$

where $G^T$ indicates the transpose of G. The term $(G^*G - I)$ represents the unexplained data or the residual, which is minimized during the iteration process.

The update, $\Delta G$, is brought to the space time domain where parts that do not need to be updated are set to zero. After that the update is transformed back to the fk-domain and, is added to the Green's function:

$$G_{i+1} = G_i + \alpha \Delta G, \tag{6}$$

where $\alpha$ is a positive frequency-independent factor that scales the update step in such a way that the objective function value decreases. One possible way to find a value for α is calculating the terms:

$$V = G^*_i G_i - I, \quad (7a)$$

and $$\Delta V = \Delta G^* G_i + \Delta G G^*_i. \quad (7b)$$

Bringing ΔV and V to the space-time domain, denoted by Δv and v, and the scaling factor can now be found by:

$$\alpha = -(\Sigma_{t,j,k} \Delta v_{t,j,k} v_{t,j,k})/(\Sigma_{t,j,k} \Delta v_{t,j,k} \Delta v_{t,j,k}), \quad (8)$$

where $\Sigma_{t,j,k}$ indicates a summation over all the elements after multiplication.

Figure 4:
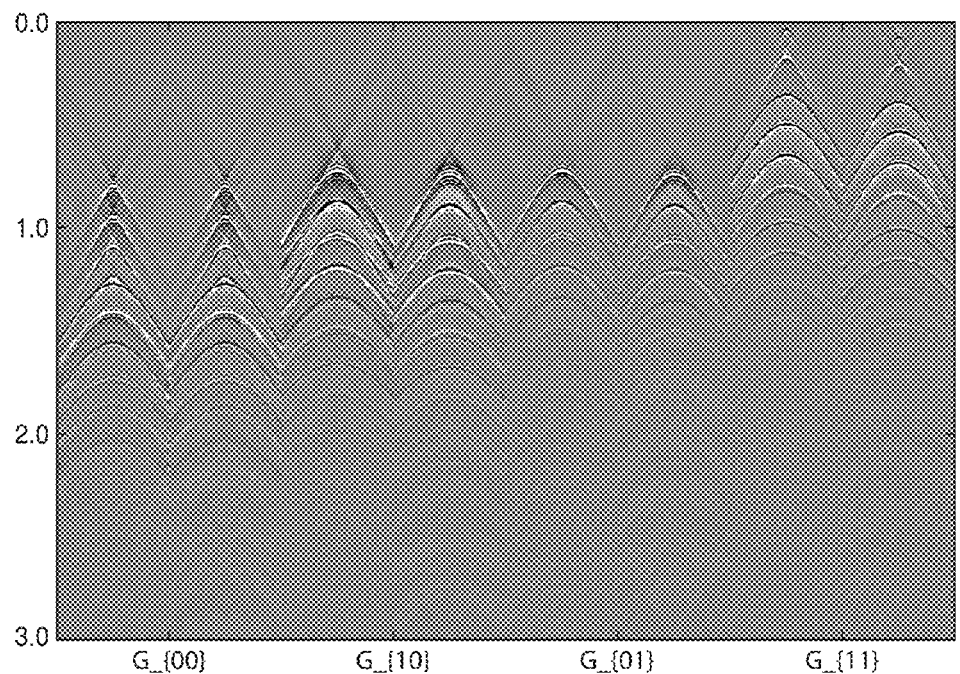
FIG. 4 show Green's functions for the test example of FIGS. 3A-3E, with the true (left) and the estimated (right) Green's functions put side by side for $G(z_0,z_0)$, $G(z_1,z_0)$, $G(z_0,z_1)$, and $G(z_1,z_1)$.

The results of the estimation are shown in FIG. 4. This figure shows that it is possible to reconstruct all possible wavefields inside the box in great detail from masked surface data only. Note the slight time shift between the true and estimated $G(z_1,z_0)$, $G(z_0,z_1)$, and $G(z_1,z_1)$. This is because of the fact that the $z_1$ depth level in the estimation was not chosen the same as the $z_1$ depth level used for modeling the true data. (Note that when dealing with field data, one will not know the exact depth level $z_1$.) The primary reflections in $G(z_1,z_1)$ are a sort of upside-down version of $G(z_0,z_0)$ and are illuminating the subsurface in the box from below! An illustration of what this would mean in terms of raypaths can be seen in the raypath between points 3 and 4 in FIG. 1C.

Figure 8:
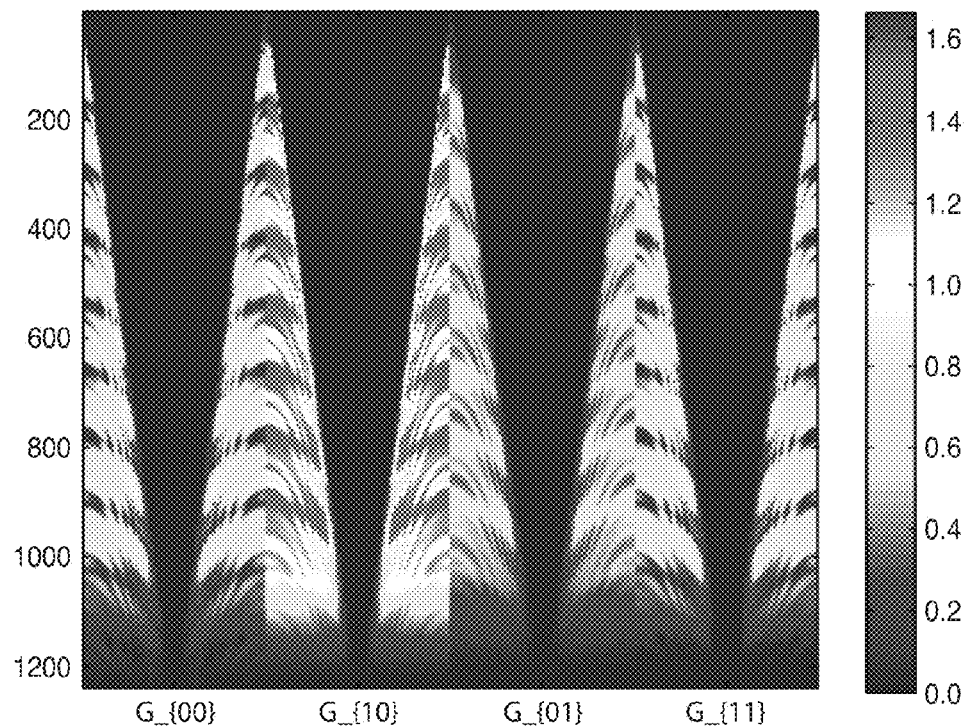
FIG. 8 shows the final estimated $G(z_0,z_0)$, $G(z_1,z_0)$, $G(z_0,z_1)$, $G(z_1,z_1)$ in the fk-domain.
Figure 9:
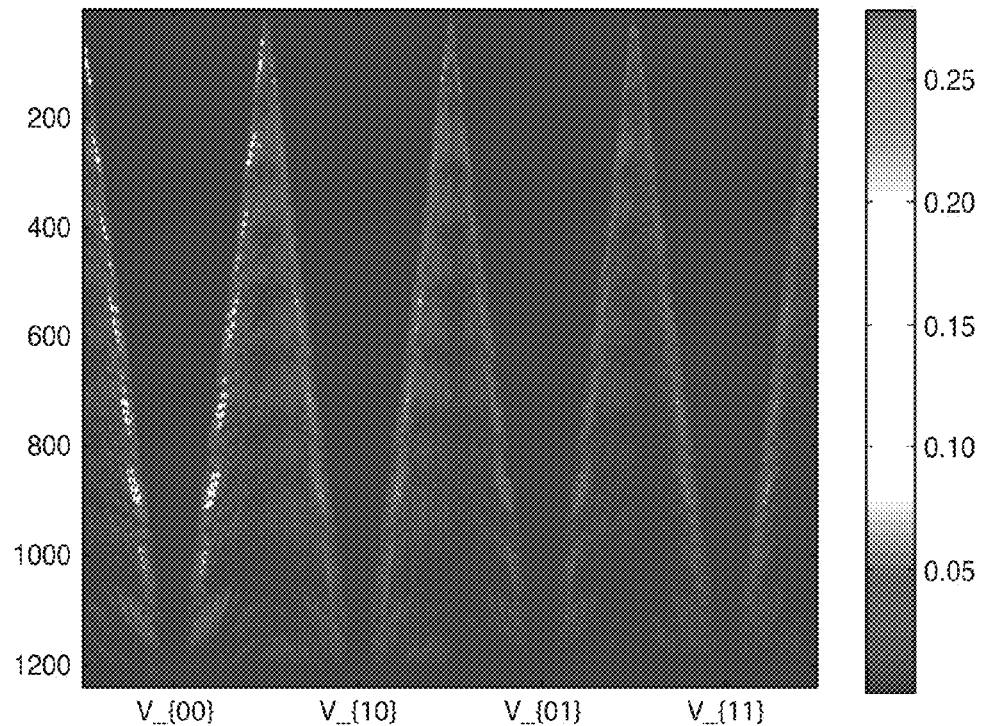
FIG. 9 shows the unexplained data V=G*G−I, consisting of the final $V(z_0,z_0)$, $V(z_1,z_0)$, $V(z_0,z_1)$, $V(z_1,z_1)$ in the fk-domain.
Figure 10:
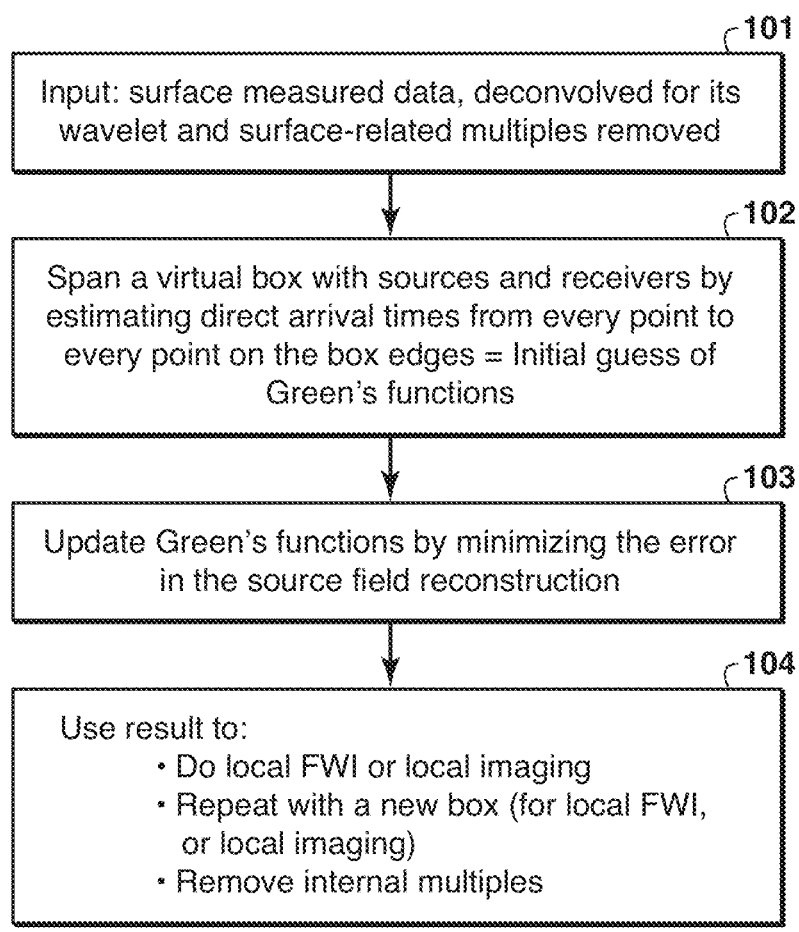
FIG. 10 is a flow chart showing basic steps in one embodiment of the present inventive method.

FIG. 8 shows the final estimated G in the fk-domain, and FIG. 9 shows the final unexplained data, i.e. the final residual V=(G*G−I) in the fk-domain. As can be observed, the residual is quite small.

The information of interest in the data is part of the wavefield $Y(z_1,z_1)$. In order to get to it, equation 1 can be written:

$$X_0(z_0,z_0) = G(z_0,z_0) + G(z_0,z_1) Y(z_1,z_1) G(z_1,z_0), \quad (9)$$

All the internal multiples related to the subsurface inside the box can be removed with the obtained Green's functions in three steps.

The first step is the removal of $G(z_0,z_0)$ from $X_0(z_0,z_0)$ by a simple subtraction. This removes events from the surface data that have never been below the bottom of the box. FIG. 3C shows the result of this. As can be seen, the upper five events in FIG. 3A, being the primaries that have never been outside the box, have also been removed as expected. What is shown in FIG. 3C equals:

$$G(z_0,z_1) Y(z_1,z_1) G(z_1,z_0) = X_0(z_0,z_0) - G(z_0,z_0). \quad (10)$$

The second step is to remove $G(z_0,z_1)$ and $G(z_1,z_0)$:

$$Y(z_1,z_1) = G(z_0,z_1)^{-1}(X_0(z_0,z_0) - G(z_0,z_0)) G(z_1,z_0)^{-1}. \quad (11)$$

To plot the result of this in a way that one can easily relate to, $G_1(z_0,z_1)$ and $G_1(z_1,z_0)$ are introduced, which are equal to $G(z_0,z_1)$ and $G(z_1,z_0)$, but without internal multiples. FIG. 3D equals:

$$G_1(z_0,z_1) Y(z_1,z_1) G_1(z_1,z_0) = F(z_0,z_1)(X_0(z_0,z_0) - G(z_0,z_0)) F(z_1,z_0), \quad (12)$$

where $F(z_i,z_j) = G_1(z_i,z_j) G(z_i,z_j)^{-1}$. Note that the multidimensional filter, $G(z_i,z_j)^{-1}$, is collapsing the internal multiples that are created during the transmission between the top and the bottom of the box onto the original signal, thereby increasing the signal strength.

The third step is to remove the "bottom of the box related multiples" from $Y(z_1,z_1)$ to obtain the "bottom of the box related primaries", $Y_1(z_1,z_1)$. In a "bottom of the box related primary" wavefield, no multiples are present related to reflectors above the bottom of the box; it can however contain multiples related to reflectors below the bottom of the box. The forward model for these "bottom of the box related multiples and primaries" is:

$$Y(z_1,z_1) = Y_1(z_1,z_1) + Y_1(z_1,z_0) G(z_1,z_1) Y(z_1,z_0). \quad (13)$$

$G(z_1,z_1)$ will turn every incoming wavefield into an outgoing wavefield via a U-turn (see the raypath between receivers 3 and 4 in FIG. 1B. $Y_1(z_1,z_0)$ will take the wavefield from the bottom of the box deeper into the subsurface and back (see the raypath between position 4 and 5). For this example, it was chosen to solve equation 13 iteratively with $Y_1(z_1,z_1) = Y(z_1,z_1)$ in the first iteration. The result after 3 iterations, $G_1(z_0,z_1) G_1(z_1,z_0)$, can be seen in FIG. 3E.

Learned Lessons from Field Data Tests

The 1.5D method to remove internal multiples was applied to a field dataset. The test clearly demonstrated that internal scattering inside the box can be removed from the reflections in the data coming from below the box, even though they overlap severely, without an adaptive subtraction, avoiding the risk of attenuating primary signal.

Other Applications of the Box

Figures 5A, 5B, 5C:
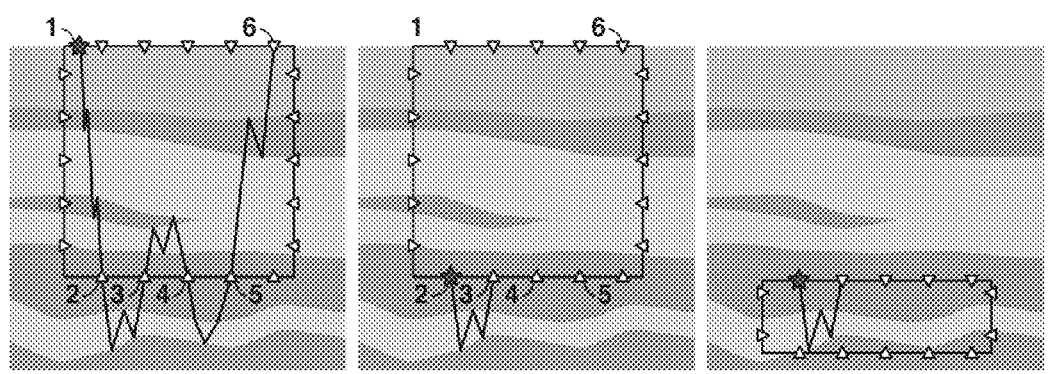
FIGS. 5A-5C show that from the measured data $X_0(z_0,z_0)$ shown in FIG. 5A, $Y_1(z_1,z_0)$, shown in FIG. 5B, can be determined.

FIGS. 5A and 5B show what has been described so far. FIG. 5C shows a new box that is drawn around an area of interest (e.g. the reservoir) to obtain the local Green's function. With the aid of these local Green's functions one might, for example, perform a local full waveform inversion or local imaging.

Benefits for Doing FWI Inside the Box

If one has the Green's functions in the second box (FIG. 5C), one has to do a full wave form inversion only for the subsurface parameters inside the second box; obviously inverting for fewer parameters in full waveform inversion is cheaper. But there are two other reasons why the end result might be better; 1) In order to estimate the subsurface properties in the reservoir (in the second box) one needs to know the transmission of the wavefields through the first box. The Greens functions $G(z_0,z_1)$ and $G(z_1,z_0)$ estimated in the first box might better describe the transmission through the subsurface in the first box, than the modeled wavefield that FWI uses based on its estimates of the subsurface properties in the first box. This is because the Green's functions treat the inside of the box as a black box, making fewer assumptions about the physical phenomena that can occur in FWI. 2) The local Green's functions in the second box contain only events related to the local properties to be estimated, reducing the amount of cross talk drastically.

Benefits for Doing RTM Inside the Box

Clearly, the removal of internal multiples will be beneficial to all currently available imaging algorithms. But more spectacular is the fact that with a perfect velocity model and receivers all around the area of interest (e.g. a reservoir in the second box), RTM will give the perfect result. The Green's functions, G, simply are the receivers (and sources) all around the area of interest.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Berkhout, A. J., Seismic migration, imaging of acoustic energy by wave field extrapolation, a: theoretical aspects, Elsevier (1982).

Fink, M., Time-reversal acoustics in complex environments, *Geophysics*, 71, SI151-SI164 (2006).

Jakubowicz, H., Wave equation prediction and removal of interbed multiples, 68th Annual International Meeting, Soc. Expl. Geophys., *Expanded Abstracts*, 1527-1530 (1998.)

Thorbecke, J., Common Focus Point Technology, PhD thesis, Delft University of Technology, (1997).

van Groenestijn, G. J. A., and Verschuur, D. J., Estimating primaries by sparse inversion and application to near-offset data reconstruction: *Geophysics*, 74, no. 3, A23-A28 (2009).

Verschuur, D. J., Berkhout, A. J., and Wapenaar, C. P. A., Adaptive surface-related multiple elimination, *Geophysics*, 57, no. 9, 1166-1177 (1992).

Verschuur, D. J., and Berkhout, A. J., Removal of interbed multiples, 58th Annual International Meeting, Eur. Ass. of Geosc. and Eng., *Expanded Abstracts*, (1996).

Kees Wapenaar, Filippo Broggini, and Roel Snieder, A proposal for model—independent 3D wave field reconstruction from reflection data, *SEG Expanded Abstracts* 30 (2011).

The invention claimed is:

1. A method comprising:
defining, with a computer, a virtual subsurface box having sources and receivers located on its edges or faces, wherein the virtual subsurface box represents a selected part of Earth's subsurface;
estimating, with a computer, Green's functions by estimating direct arrival times from locations of the sources to locations of the receivers;
updating, with a computer, the Green's functions by one of iterative optimization that minimizes error in source field reconstruction, a series expansion, or iterative wavefield extrapolation; and
running a simulation, with a computer, wherein the simulation simulates seismic waves generated by the sources being reflected off of at least two subsurface reflectors, which causes simulated internal multiple reflections within the box from the optimized Green's functions, and subtracting the simulated internal multiples from seismic data collected by actual receivers, wherein the seismic data includes internal multiple reflections, and the subtracting reduces the internal multiple reflections in the seismic data;
generating, with a computer, a subsurface image from the seismic data with the simulated internal multiples subtracted therefrom.

2. The method of claim 1, wherein the seismic data were measured using surface source and receiver locations, the box is defined to have a top face located on the surface, and data measured at the surface receiver locations are used in the iterative optimization, series expansion, or iterative wavefield extrapolation, wherein the source and receiver locations in or on the box that are located below the surface are virtual rather than actual.

3. The method of claim 2, wherein said simulation uses a seismic wavelet determined by deconvolving the seismic data.

4. The method of claim 1, wherein the source field reconstruction comprises multi-dimensional auto-correlation of the estimated or updated Green's functions.

5. The method of claim 1, further comprising defining, below the box, hereinafter called the first box, a second virtual box and repeating the obtaining of optimized Green's functions for the second virtual box.

6. The method of claim 5, wherein the second virtual box has a top face that coincides, at least partly, with a bottom face of the first box.

7. The method of claim 6, wherein further virtual boxes are defined and the method of claim 1 is repeated for each of them, until an entire subsurface region has been processed.

8. The method of claim 1, wherein the running the simulation includes using a forward model that is expressed as, or is mathematically equivalent to:

$$X_0 = G + GYG,$$

and $$G^*G = I,$$

where
$X_0$ is an outgoing impulse response, representing a seismic wavefield that starts in the box and moves out of the box;
Y is an incoming impulse response, representing a seismic wavefield that starts outside the box and moves into the box;
G is a Green's function representing a seismic wavefield that starts in the box and ends at an edge or face of the box, never leaving the box; and
I is a reconstructed seismic source.

9. The method of claim 8, further comprising using the reconstructed seismic source to reconstruct missing surface seismic data for further processing of the seismic data that requires source and receiver locations on a regular grid.

10. The method of claim 1, further comprising generating a velocity model for the box with a full waveform inversion process, wherein the subsurface image is generated using the velocity model.

* * * * *